Figure 1:
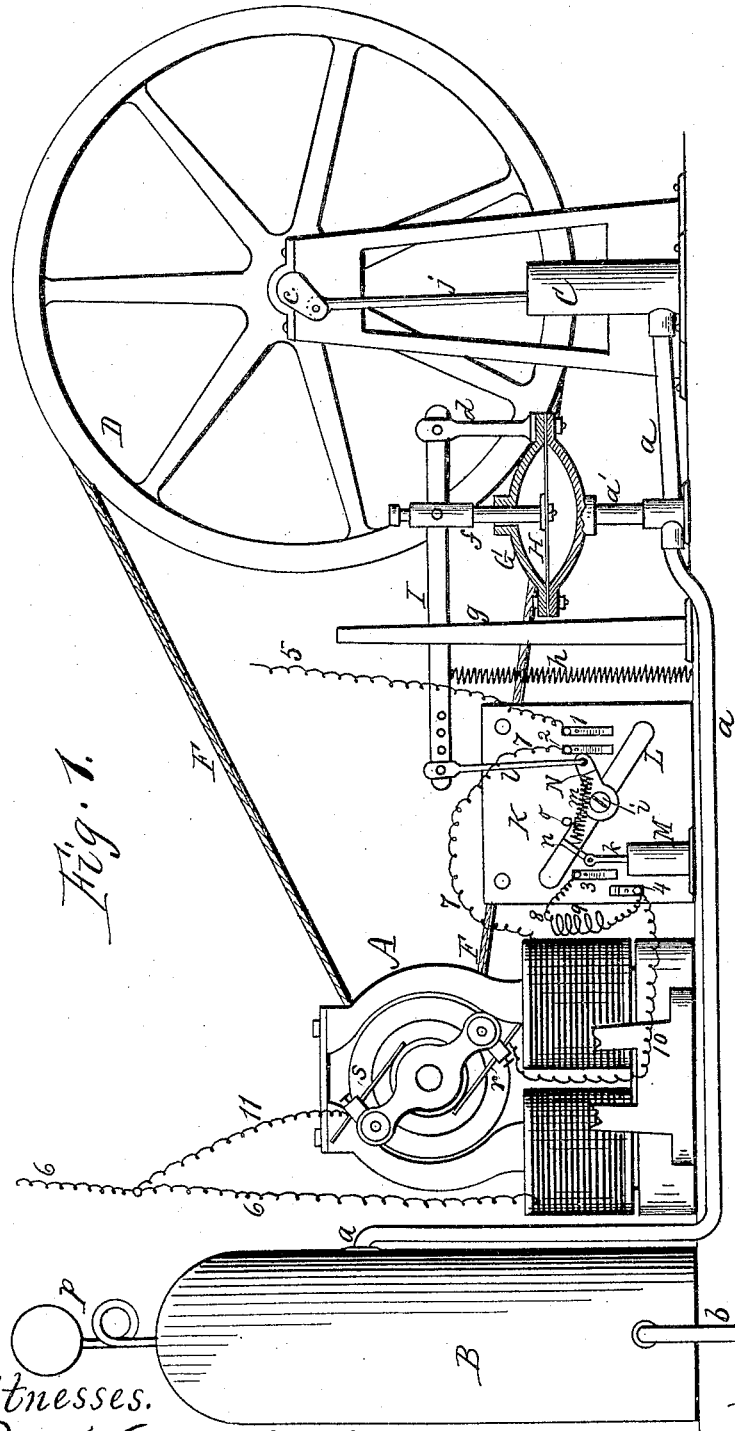

(No Model.) 2 Sheets—Sheet 1.

E. H. FREEMAN.
FLUID PRESSURE REGULATOR.

No. 574,846. Patented Jan. 5, 1897.

Witnesses.
P. H. Costich
A. S. Smith

Inventor.
Edgar H. Freeman,
per R. F. Osgood,
Atty.

(No Model.) 2 Sheets—Sheet 2.
E. H. FREEMAN.
FLUID PRESSURE REGULATOR.
No. 574,846. Patented Jan. 5, 1897.
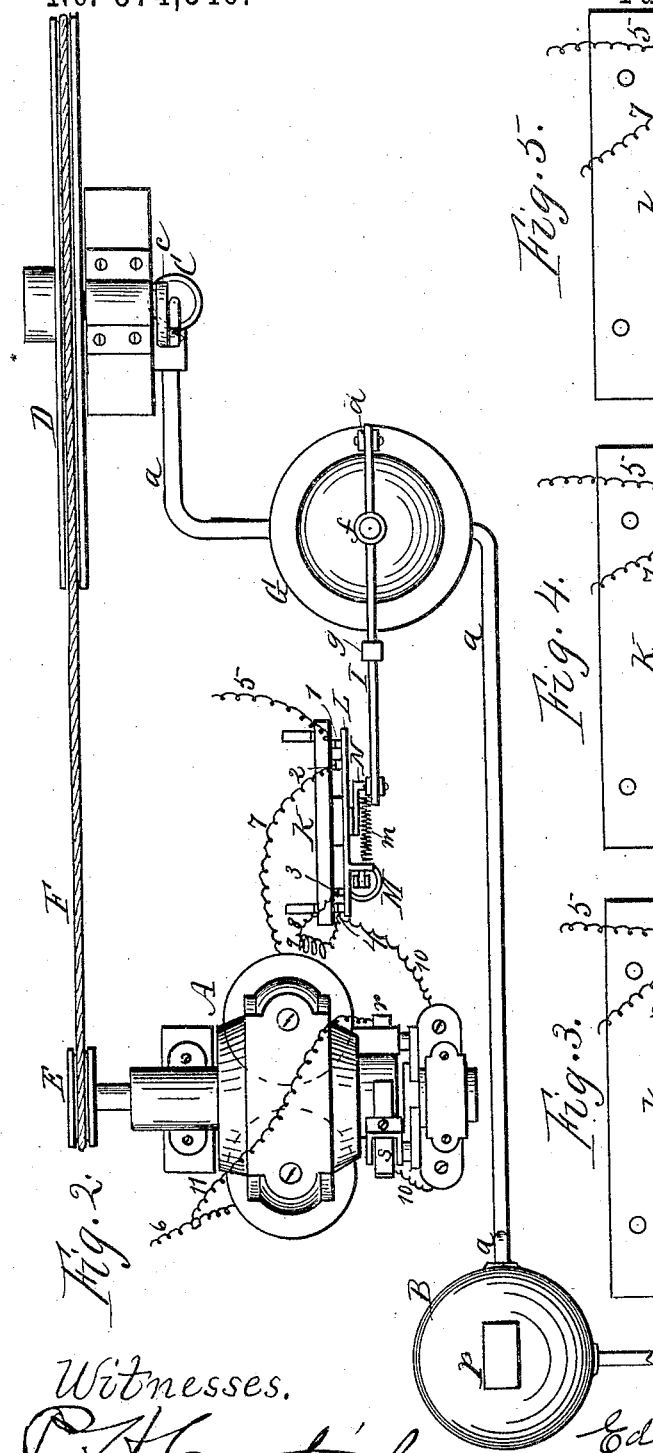
Witnesses.
Inventor.
Edgar H. Freeman,
per R. F. Osgood,
Atty.

United States Patent Office.

EDGAR H. FREEMAN, OF ROCHESTER, NEW YORK, ASSIGNOR OF THREE-FOURTHS TO MOSS MOSELY, OF SAME PLACE.

FLUID-PRESSURE REGULATOR.

SPECIFICATION forming part of Letters Patent No. 574,846, dated January 5, 1897.

Application filed July 16, 1894. Renewed July 11, 1896. Serial No. 598,905. (No model.)

*To all whom it may concern:*

Be it known that I, EDGAR H. FREEMAN, of Rochester, in the county of Monroe and State of New York, have invented a certain new and useful Improvement in Fluid-Pressure Regulators; and I do hereby declare that the following is a full, clear, and exact description of the same, reference being had to the drawings accompanying this application.

The object of my improvement is to regulate the pressure of air in a tank by means of an electric apparatus in which a motor is used, the motor being set in motion when the compression falls below a given degree and stopped when the maximum degree is reached.

The invention consists in the combination and arrangement of parts hereinafter described, and embodied in the claims.

In the drawings, Figure 1 is a side elevation, partially in section, of the apparatus. Fig. 2 is a plan view. Figs. 3, 4, and 5 are enlarged elevations of the switch apparatus, showing different positions of the switch-arm.

A indicates a motor of any suitable form.

B is a tank having an inlet-pipe $a$ and exit-pipe $b$.

C is a pump by which air is forced through pipe $a$ into the tank. It is driven by a crank $c$ on the shaft of a band-wheel D. This band-wheel is connected with a pulley E on the shaft of the motor by a band F. By this means the motor drives the pump.

G is a casing containing a diaphragm H. The casing is supplied with air under the diaphragm by means of a stand-pipe $a'$, connected with the pipe $a$, by which means the pressure under the diaphragm is the same as that in the tank.

I is a lever above the diaphragm, pivoted to a fulcrum-arm $d$, and connected with the diaphragm by a rod $f$. As the diaphragm rises and falls the lever rises and falls with it. The lever is guided in moving up and down by a slotted standard $g$. It is drawn forcibly downward by a spring $h$.

K is a switchboard made of porcelain or other non-conducting material. On one face of this board is centrally pivoted at $i$ a switch-arm L, free to swing up and down within a given range. On this board are also four electrodes or contact-points 1 2 3 4, the first three being in the form of springs, and the last being fixed and forming a stop to the switch-arm as it comes in a horizontal position. When the arm is swung to its highest position, as in Figs. 1 and 3, the arm is out of contact with all the electrodes, and the circuit is then broken and the motor is stopped. In its partial down movement, as shown in Fig. 4, the arm comes in contact with electrodes 1, 2, and 3 and serves as a conductor between them. When fully down, as in Fig. 5, it comes in contact with all four of the electrodes.

M is a dash-pot filled with glycerin, and K a rod connecting its piston with the arm L on one side of the pivot. Its object is to prevent too-rapid movement of the arm in rising and falling.

N is a crank-arm turning freely on the same center with the switch-arm.

$l$ is a rod connecting the outer end of the crank-arm with the long end of the lever I, and $m$ is a spring connecting the outer end of the crank-arm with a stop $n$ of the switch-arm on the opposite side of the pivot.

$o$ is a stop to the upstroke of the switch-arm.

$p$ is a gage connected with the air-tank to indicate pressure.

The electrical connections are as follows: 5 and 6 are the main circuit-wires leading from the battery or other source of electrical energy, one connecting with the electrode 1 and the other with the field of the motor. 7 is a wire connecting electrode 2 with the field of the motor. 8 is a wire connecting electrode 3 with electrode 4 and provided with a resistance-coil 9 in its length. 10 is a wire connecting electrode 4 with brush $r$ of the motor, and 11 is a wire connecting the other brush, $s$, with the main wire 6.

The operation is as follows: When the pressure is low in the air-tank, the diaphragm falls and with it the outer end of the lever I. This carries the crank-arm N below the switch-arm L, as shown in Fig. 4, and the spring $m$, then being below the pivot, draws the switch-arm down, bringing it in contact with the electrodes 1 2 3, and thus establishing the circuits which were previously broken by the switch-arm being out of contact with the electrodes. The circuit is now from wire 5, through electrode 1, the switch-arm L, electrode 2, wire 7, through the field of the motor, wire 6, back to the battery. There is also another circuit from wire 5, through electrode 1, switch-arm L, electrode 3, wire 8, resistance-coil 9, electrode 4, wire 10, brush r, the armature of the motor, brush s, wire 11, and wire 6, back to the battery. The motor receives motion from these two circuits through the field and armature, but is retarded by the resistance. Hence the motion is slow, which prevents burning of the wire and shock on the machinery. The further motion of the switch-arm L brings it in contact with electrode 4, as shown in Fig. 5, and the secondary circuit above described is cut out, and a new circuit is then established in its place—viz., from wire 5, through electrode 1, switch-arm L, electrode 4, wire 10, brushes r s, wire 11, and wire 6. The resistance being cut out, the full force of the motor is turned on and the pump is operated rapidly to fill the tank. During this time the diaphragm H and lever I are rising and drawing up the crank-arm N, and as soon as the latter rises at such height above the switch-arm as to bring the spring m above the pivot again the switch-arm is raised out of contact with the electrodes, as shown in Fig. 3, the circuit is broken again, and the motor stops.

This apparatus is useful in many operations where even pressure of the air is required in a tank, for instance, in raising liquids, such as beer, where the drawing of the liquid reduces the air-pressure. It is also applicable to regulating the pressure of gas and liquid in the same manner.

Having described my invention, what I claim as new, and desire to secure by Letters Patent, is—

1. In a fluid-pressure regulator, the combination, with the motor and pump, of a pivoted switch-arm, a pivoted crank-arm, a spring connecting the two on opposite sides of the pivot, a set of three electrodes so arranged that the switch rests in contact with all three when it is partially turned down, a fourth electrode so arranged that the switch rests in contact with all four when turned fully down, and electrical connections connecting the electrodes with a battery and the motor, as and for the purpose specified.

2. In a fluid-pressure regulator, the combination, with the motor and pump, of a pivoted switch-arm, a pivoted crank-arm, a spring connecting said arms on opposite sides of the pivot, a dash-pot, a rod connecting the dash-pot with the switch-arm, a diaphragm, a lever connected with the diaphragm so as to be operated by it, and a rod connecting the lever with the crank-arm, as and for the purpose specified.

In witness whereof I have hereunto signed my name in the presence of two subscribing witnesses.

E. H. FREEMAN.

Witnesses:
R. F. OSGOOD,
F. B. HUTCHINSON.